(12) United States Patent
Lee et al.

(10) Patent No.: US 10,632,848 B2
(45) Date of Patent: Apr. 28, 2020

(54) BATTERY MODULE OF IMPROVED SAFETY

(75) Inventors: Jin Kyu Lee, Busan (KR); Jaeseong Yeo, Daejeon (KR); Yongshik Shin, Daejeon (KR); Hee Soo Yoon, Daejeon (KR); BumHyun Lee, Seoul (KR); Dal Mo Kang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 860 days.

(21) Appl. No.: 12/842,741

(22) Filed: Jul. 23, 2010

(65) Prior Publication Data

US 2011/0070474 A1 Mar. 24, 2011

Related U.S. Application Data

(63) Continuation of application No. PCT/KR2010/001987, filed on Mar. 31, 2010.

(30) Foreign Application Priority Data

Apr. 1, 2009 (KR) .................. 10-2009-0027934

(51) Int. Cl.
*B60L 3/00* (2019.01)
*H01M 2/10* (2006.01)
(Continued)

(52) U.S. Cl.
CPC ........... *B60L 3/0046* (2013.01); *B60L 3/0053* (2013.01); *B60L 58/26* (2019.02); *H01M 2/1077* (2013.01); *H01M 2/206* (2013.01); *H01M 10/482* (2013.01); *H01M 10/613* (2015.04); *H01M 10/647* (2015.04); *H01M 10/659* (2015.04); *H01M 10/6551* (2015.04); (Continued)

(58) Field of Classification Search
CPC ......... H01M 10/5053; H01M 10/6551; H01M 10/6553
See application file for complete search history.

(56) References Cited

U.S. PATENT DOCUMENTS 6,004,693 A * 12/1999 Fukuda ............... H01M 2/0275
429/175
6,038,156 A * 3/2000 Inam et al. ................... 363/133
(Continued)

FOREIGN PATENT DOCUMENTS

CN 1189925 A 8/1998
CN 1848518 A 10/2006
(Continued)

OTHER PUBLICATIONS

Machine translation of JP 2005-209365, Takatsu et al., Aug. 4, 2008.*
(Continued)

*Primary Examiner* — Barbara L Gilliam
*Assistant Examiner* — Helen M McDermott
(74) *Attorney, Agent, or Firm* — Birch, Stewart, Kolasch & Birch, LLP

(57) ABSTRACT

Disclosed herein is a battery module configured in a structure in which a plurality of battery cells or unit modules ('unit cells') are stacked, and a heat sink is mounted to electrical connection regions between the unit cells and/or to outsides of battery module connection members connected to the electrical connection regions.

23 Claims, 6 Drawing Sheets

(51) Int. Cl.

| | | |
|---|---|---|
| *H01M 10/48* | (2006.01) | |
| *H01M 10/659* | (2014.01) | |
| *H01M 10/6555* | (2014.01) | |
| *H01M 10/6551* | (2014.01) | |
| *H01M 10/613* | (2014.01) | |
| *H01M 10/6553* | (2014.01) | |
| *H01M 10/647* | (2014.01) | |
| *H01M 10/6554* | (2014.01) | |
| *H01M 2/20* | (2006.01) | |
| *H01M 10/653* | (2014.01) | |
| *H01M 10/6561* | (2014.01) | |
| *H01M 10/6557* | (2014.01) | |
| *B60L 58/26* | (2019.01) | |

(52) U.S. Cl.
CPC ... *H01M 10/6553* (2015.04); *H01M 10/6554* (2015.04); *H01M 10/6555* (2015.04); *H01M 10/6557* (2015.04); *H01M 10/6561* (2015.04); *H01M 10/653* (2015.04); *H01M 2220/20* (2013.01); *Y02T 10/7005* (2013.01); *Y02T 10/705* (2013.01); *Y02T 90/34* (2013.01)

(56) References Cited

U.S. PATENT DOCUMENTS

| | | | |
|---|---|---|---|
| 6,423,441 B1 * | 7/2002 | Ronning | H01M 2/202 361/748 |
| 7,833,655 B2 | 11/2010 | Yoon et al. | |
| 7,875,378 B2 | 1/2011 | Yang et al. | |
| 7,931,979 B2 | 4/2011 | Choi et al. | |
| 7,968,223 B2 | 6/2011 | Lee et al. | |
| 2001/0031392 A1 * | 10/2001 | Ogata et al. | 429/99 |
| 2002/0182480 A1 * | 12/2002 | Hanauer et al. | 429/62 |
| 2005/0089751 A1 * | 4/2005 | Oogami et al. | 429/162 |
| 2005/0202310 A1 * | 9/2005 | Yahnker et al. | 429/62 |
| 2006/0273758 A1 | 12/2006 | Sanada et al. | |
| 2007/0184711 A1 | 8/2007 | Thrap et al. | |
| 2009/0220853 A1 * | 9/2009 | Yang et al. | 429/159 |
| 2011/0097620 A1 * | 4/2011 | Kim | 429/161 |

FOREIGN PATENT DOCUMENTS

| | | |
|---|---|---|
| CN | 1993846 A | 7/2007 |
| CN | 101378110 A | 3/2009 |
| CN | 101395737 A | 3/2009 |
| DE | 100 03 740 C1 | 6/2001 |
| DE | 10 2007 031 674 A1 | 1/2009 |
| JP | 8-148187 A | 6/1996 |
| JP | 11-354166 A | 12/1999 |
| JP | 2001-057196 A | 2/2001 |
| JP | 2001-189582 A | 7/2001 |
| JP | 2002-134177 A | 5/2002 |
| JP | 2002-291670 A | 10/2002 |
| JP | 2002-373638 A | 12/2002 |
| JP | 2003-163036 A | 6/2003 |
| JP | 2004-227986 A | 8/2004 |
| JP | 2005-240391 A | 9/2005 |
| JP | 2005-317456 A | 11/2005 |
| JP | 2006-210245 A | 8/2006 |
| JP | 2007-317578 A | 12/2007 |
| JP | 2009-520330 A | 5/2009 |
| JP | 2009-526361 A | 7/2009 |
| JP | 2009-529136 A | 8/2009 |
| KR | 10-0751623 B1 | 8/2007 |
| KR | 10-0767911 B1 | 10/2007 |
| WO | WO 2007/091757 A1 | 8/2007 |
| WO | WO 2007/102671 A1 | 9/2007 |
| WO | WO 2008/104357 A1 | 9/2008 |

OTHER PUBLICATIONS

Supplementary European Search Report dated Dec. 5, 2013 in EP 10759236.6.

* cited by examiner

BATTERY MODULE OF IMPROVED SAFETY

This application is a Continuation of PCT International Application No. PCT/KR2010/001987 filed on Mar. 31, 2010, which claims the benefit of Patent Application No. 10-2009-0027934 filed in Republic of Korea, on Apr. 1, 2009. The entire contents of all of the above applications is hereby incorporated by reference into the present application.

TECHNICAL FIELD

The present invention relates to a battery module having improved safety, and, more particularly, to a battery module configured in a structure in which a plurality of battery cells or unit modules ('unit cells') are stacked, and a heat sink is mounted to electrical connection regions between the unit cells and/or to outsides of battery module connection members connected to the electrical connection regions.

BACKGROUND ART

Recently, a secondary battery, which can be charged and discharged, has been widely used as an energy source for wireless mobile devices. Also, the secondary battery has attracted considerable attention as a power source for electric vehicles (EV), hybrid electric vehicles (HEV), and plug-in hybrid electric vehicles (Plug-in HEY), which have been developed to solve problems, such as air pollution, caused by existing gasoline and diesel vehicles using fossil fuels.

Small-sized mobile devices use one or several battery cells for each device. On the other hand, middle- or large-sized devices, such as vehicles, use a middle- or large-sized battery module having a plurality of battery cells electrically connected to one another because high power and large capacity are necessary for the middle- or large-sized devices.

Preferably, the middle- or large-sized battery module is manufactured so as to have as small a size and weight as possible. For this reason, a prismatic battery or a pouch-shaped battery, which can be stacked with high integration and has a small weight to capacity ratio, is usually used as a battery cell (unit battery) of the middle- or large-sized battery module. Especially, much interest is currently focused on the pouch-shaped battery, which uses an aluminum laminate sheet as a sheathing member, because the weight of the pouch-shaped battery is small, the manufacturing costs of the pouch-shaped battery are low, and it is easy to modify the shape of the pouch-shaped battery.

Battery cells constituting such a middle- or large-sized battery module are secondary batteries which can be charged and discharged. Consequently, a large amount of heat is generated from the high-power, large-capacity secondary batteries during the charge and discharge of the batteries. In particular, the laminate sheet of each pouch-shaped battery widely used in the battery module has a polymer material exhibiting low thermal conductivity coated on the surface thereof, with the result that it is difficult to effectively lower the overall temperature of the battery cells.

If the heat, generated from the battery module during the charge and discharge of the battery module, is not effectively removed, the heat accumulates in the battery module, with the result that deterioration of the battery module is accelerated. According to circumstances, the battery module may catch fire or explode. For this reason, a cooling system is needed in a battery pack for vehicles, which is a high-power, large-capacity battery, to cool battery cells mounted in the battery pack.

Each battery module mounted in a middle- or large-sized battery pack is generally manufactured by stacking a plurality of battery cells with high integration. In this case, the battery cells are stacked in a state in which battery cells are arranged at predetermined intervals such that heat generated during charge and discharge of the battery cells is removed. For example, battery cells may be sequentially stacked in a state in which the battery cells are arranged at predetermined intervals without using an additional member. Alternatively, in a case in which the battery cells have low mechanical strength, one or more battery cells are mounted in a cartridge, and a plurality of cartridges are stacked to constitute a battery module. In order to effectively remove heat accumulating between the stacked battery cells or between the stacked battery modules, coolant channels may be defined between the stacked battery cells or between the stacked battery modules.

In this structure, however, it is necessary to provide a plurality of coolant channels corresponding to the number of the battery cells, with the result that the overall size of the battery module is increased.

Also, coolant channels having relatively small intervals are provided in a case in which a plurality of battery cells are stacked in consideration of the size of the battery module. As a result, design of the cooling structure is complicated. That is, the coolant channels have relatively small intervals as compared with a coolant inlet port, with the result that high pressure loss is caused. Consequently, it is very difficult to design the shape and location of a coolant inlet port and a coolant outlet port. Also, a fan may be further provided to prevent such pressure loss. In this case, however, design may be restricted in terms of power consumption, fan noise, space, etc.

Meanwhile, for plug-in hybrid electric vehicles or electric vehicles, which have recently become a focus of attention, a battery pack requires power corresponding to acceleration performance generated by an internal combustion engine. As a result, very high current may flow in the battery pack for several minutes. In this case, high-temperature heat is generated from electrical interconnection regions between the battery cells, and such heat affects the battery cells through thermal conduction. For this reason, it is necessary to configure the battery module in a structure in which such heat is controlled.

Also, in a case in which high-temperature heat is generated from the electrical interconnection regions due to high current, it is necessary to control the electrical interconnection regions. However, using a method of cooling the battery cells or providing an active cooling device to control the temperature of the electrical interconnection regions is not effective in terms of space or costs.

In addition, a conventional middle- or large-sized battery module used as a power source of hybrid electric vehicles uses temporarily high current. However, the internal combustion engine is a main power source, and the battery module is an auxiliary power source, with the result that use time at high current is very short, and therefore, heat sufficient to affect the battery cells is not generated. For this reason, an additional structure or method for cooling the electrical interconnection regions is not considered.

Consequently, there is a high necessity for a battery module that provides high power and large capacity and that is capable of effectively reducing heat generated from electrical interconnection regions between the cells, thereby providing excellent life span and safety.

DISCLOSURE

Technical Problem

Therefore, the present invention has been made to solve the above problems, and other technical problems that have yet to be resolved.

Specifically, it is an object of the present invention to provide a battery module that is capable of effectively absorbing high-temperature heat generated from electrical interconnection regions between unit cells and/or battery module connection members to maintain temperature of the members at a predetermined level or less, thereby exhibiting excellent life span and safety.

Technical Solution

In accordance with one aspect of the present invention, the above and other objects can be accomplished by the provision of a battery module configured in a structure in which a plurality of battery cells or unit modules ('unit cells') are stacked, and a heat sink is mounted to electrical connection regions between the unit cells and/or to outsides of battery module connection members connected to the electrical connection regions.

Kind of the battery cell or kind of the battery cell constituting each of the unit modules is not particularly restricted as long as the battery cell the battery cell generates heat during operation. For example, the battery cell may be a secondary battery. Of course, on the other hand, a fuel cell may be included.

In the battery module according to the present invention, therefore, high-temperature heat generated from the electrical connection regions between the unit cells or the battery module connection members is absorbed by the heat sink, for example, during the charge and discharge of the unit cells, in particular, during high-current discharge of the unit cells, to restrain the abrupt increase of temperature at the electrical connection regions between the unit cells or the battery module connection members, thereby effectively preventing the change in resistance of the battery module caused from physical and/or chemical deformation of the electrical connection regions between the unit cells or the battery module connection members due to high-temperature heat.

The heat absorbed by the heat sink as described above is discharged, for example, when the overall temperature of the battery module is lowered, e.g., in a non-operation state or in a low-current discharge state. Consequently, the battery module according to the present invention has a temperature self-control function. Also, it is possible for the heat sink to provide a desired effect without greatly deforming the structure of the battery module or the corresponding connection members of the battery module.

In the battery module, one or two heat sinks may be mounted at the electrical connection regions between the unit cells or the battery module connection members according to the specification of the battery module requiring unit cells.

The corresponding regions of the battery module at which the heat sink is mounted are outsides of the battery module connection members disposed in direct contact with or adjacent to regions where a relatively large amount of heat is generated, such as the electrical connection regions between the unit cells. For example, the battery module connection members may be bus bars for connecting electrode terminals of the unit cells to external input and output terminals.

Structure of the heat sink is not particularly restricted as long as the heat sink can effectively absorb heat applied to the electrical connection regions between the unit cells. In a preferred example, the heat sink may include a plurality of bar type contact parts configured to be in tight contact with outsides of the electrical connection regions between the unit cells and a connection part configured to integrally connect corresponding ends of the contact parts, and the heat sink may be mounted to the battery module in such a manner that the electrical connection regions between the unit cells are inserted into slits defined between the contact parts.

In the heat sink configured in the above-stated structure, therefore, the slits are defined between the contact parts, and the electrode terminals of the unit cells are inserted into the slits, with the result that it is possible to fix the electrode terminals of the unit cells, thereby achieving a desired heat dissipation effect while achieving easy assembly.

In another preferred example, the heat sink may be formed in a shape corresponding to the outsides of the battery module connection members, and the heat sink may be mounted to insides or outsides of the battery module connection members excluding regions connected to the electrical connection regions.

Since the heat sink is formed in a shape corresponding to the outsides of the battery module connection members, as described above, it is possible for the heat sink to uniformly absorb heat applied to the battery module connection members.

According to circumstances, the heat sink may be selectively mounted to a region of the battery module where high-temperature heat is generated. For example, the heat sink may be located at the top of a sensing member for detecting voltage and/or current.

Meanwhile, structure of the heat sink is not particularly restricted as long as the heat sink can easily dissipate heat. For example, the heat sink may be configured in a structure in which an endothermic material is contained in a sealing member.

According to circumstances, the heat sink may be configured in a structure in which an endothermic material is contained in a sheet member in a state in which the endothermic material is supported by an inactive material capsule, and the sheet member may include a fiber-shaped member having high thermal conductivity. That is, the encapsulated endothermic material exhibits higher response to heat due to high specific surface area thereof. Also, the sheet member includes a fiber-shaped member having high thermal conductivity, such as metal threads or graphite threads. Consequently, it is possible to further increase thermal conductivity of the sheet member. The fiber-shaped member may be included in the sheet member in various forms. For example, the fiber-shaped member may be included in the sheet member in a net-shaped form.

Kind of the endothermic material is not particularly restricted as long as the endothermic material can absorb heat generated during the charge and discharge of the battery cells. Preferably, the endothermic material is a phase change material having latent heat when the phase of the endothermic material is changed at specific temperature.

The phase change of the phase change material is carried out at the specific temperature, preferably from a solid phase to a liquid phase or from a solid phase to a gas phase. In order to achieve such phase change, the phase change material at least has greater latent heat than the heat capacity of the battery module connection members per unit temperature. The phase change material may be a single compound, a mixture, or a complex. The phase change of the phase change material may be carried out through a physical reaction at the specific temperature. In addition, the phase change of the phase change material may be carried out through a reversible physical or chemical reaction at the specific temperature.

Representative examples of the phase change material may include paraffin, polyethylene glycol, and inorganic hydrates (for example, $Na_2HPO_4$, $12H_2O$, $Na_2SO_4$, $10H_2O$, $Zn(NO_3)_2.6H_2O$, etc.), to which, however, the phase change material is not limited. Among these, paraffin is preferably used because paraffin has relatively high latent heat, paraffin is less expensive, and the phase change temperature of paraffin can be easily controlled depending upon molecular weight thereof.

Also, a material exhibiting high thermal conductivity may be included so as to increase thermal conductivity of the phase change material. Examples of the material for increasing thermal conductivity may include metal powder and graphite powder, to which, however, the material for increasing thermal conductivity is not limited.

The above "specific temperature" means a temperature at which the performance or life span of a battery pack is lowered or the safety of the battery pack is threatened. The specific temperature may be decided depending upon structure or kind of the battery module. In particular, the specific temperature may be a temperature at which physical and/or chemical deformation of the battery module connection members may be directly caused, or the specific temperature may be a temperature at which aging of materials may be caused due to continuous thermal accumulation. The specific temperature may be decided in a temperature range of preferably 50 to 150° C., more preferably 60 to 120° C.

In this case, a phase change material, the critical temperature of which is set within the above temperature range, is preferably used as an endothermic material for preventing abrupt increase in temperature of the battery module to the specific temperature or higher.

In accordance with another aspect of the present invention, there is provided a battery module including a plurality of battery cells or unit modules ('unit cells') as unit batteries.

As defined above, the battery cells or unit modules constituting the unit cell stack are referred to as unit cells in the specification.

In a preferred example, the battery module may include (a) a unit cell stack including a plurality of battery cells or unit modules ('unit cells') connected in series to each other in a state in which the unit cells stand in the lateral direction, (b) an upper case configured to surround one side of the unit module stack and to surround a portion of the upper end and a portion of the lower end of the unit module stack, the upper case being provided at the front thereof with external input and output terminals, (c) a lower case coupled to the upper case, the lower case configured to surround the other side of the unit module stack and to surround a portion of the upper end and a portion of the lower end of the unit module stack, the upper case being provided at the front thereof with bus bars for connecting electrode terminals of the unit cells to the external input and output terminals, (d) a sensing member including sensing frames mounted in spaces defined at the front and the rear of the lower case, sensing parts disposed in the respective sensing frames, and a conduction part for connecting the sensing parts to each other, and (e) a front cover, made of an insulative material, mounted to the front of the lower case for protecting connection regions between the electrode terminals of the unit cells and the bus bars from the outside.

In the battery module with the above-stated construction, the battery cell stack is fixed by the coupling between the upper and lower case, and the sensing member is mounted to the lower case. Consequently, the overall assembly process is simplified, and the battery module is configured in a compact and stable structure.

As described above, the unit cell stack is mounted in the cases in a state in which the battery cells or the unit modules stand in the lateral direction. In the specification, regions of the battery cells or the unit modules from which the electrode terminals protrude are located in the frontward and rearward direction, and opposite sides of the battery cells or the unit modules are located in the lateral direction. Therefore, the unit cell stack stands such that the electrode terminals of the battery cells or the unit modules are directed in the frontward and rearward direction of the battery module, and one side of each of the battery cells or the unit modules is directed to the bottom.

Preferably, the unit cell stack includes a plurality of unit modules each including plate-shaped battery cells each having electrode terminals formed at an upper end and a lower end thereof, and each of the unit modules includes two or more battery cells configured in a structure in which electrode terminals of the battery cells are connected in series to each other and connections between the electrode terminals are bent, the battery cells being stacked, and a pair of high-strength cell covers coupled to each other for surrounding outsides of the battery cells excluding the electrode terminals of the battery cells.

Each of the plate-shaped battery cells may be a secondary battery having a small thickness and a relatively large width and length sufficient to minimize the overall size when the plate-shaped battery cells are stacked to constitute a battery module. In a preferred example, each of the plate-shaped battery cells may be a secondary battery configured in a structure in which an electrode assembly is mounted in a battery case formed of a laminate sheet including a resin layer and a metal layer, and electrode terminals protrude outward from the upper and lower ends of the battery case. Specifically, each of the plate-shaped battery cells may be configured in a structure in which an electrode assembly is mounted in a pouch-shaped battery case formed of an aluminum laminate sheet. A secondary battery having such a structure may be referred to as a pouch-shaped battery cell.

The case of the pouch-shaped battery cell may be configured in various structures. For example, the case may include two members. An electrode assembly may be mounted in a receiving part formed at the inside of the upper part and/or the lower part of the case, and upper and lower contact portions may be coupled to each other in a hermetically sealing manner.

The electrode assembly includes a cathode and an anode, through which the battery cell can be charged and discharged. For example, the electrode assembly may be configured such that a cathode and an anode are stacked while a separator is disposed between the cathode and the anode in a jelly-roll type structure, in a stack type structure, or in a stack/folding type structure. The cathode and the anode of the electrode assembly may be configured in a structure in which electrode tabs of the cathode and the anode directly protrude outward from the battery or in a structure in which electrode tabs of the cathode and the anode protrude outward from the battery in a state in which the electrode tabs are connected to additional leads.

The battery cells constitute a unit module configured in a structure in which one or more battery cells are surrounded by a high-strength cell cover made of a synthetic resin or a metal material. The high-strength cell cover protects the battery cells, the mechanical strength of which is low, and restrain the deformation of the battery cells due to repetitive expansion and contraction of the battery cells during the charge and discharge of the battery cells to prevent sealing portions of the respective battery cells from being separated from each other. Therefore, it is possible to manufacture a battery module having more excellent safety.

Battery cells in a unit module or battery cell of a unit module and another battery cell of another neighboring unit module are connected in series and/or in parallel to each other. For example, electrode terminals of the battery cells may be coupled to each other in a state in which the electrode terminals are arranged in series in the longitudinal direction of the battery cells such that the electrode terminals are continuously disposed adjacent to each other, two or more battery cells are folded in a stacked structure, and the folded battery cells are surrounded by a cell cover, to manufacture a plurality of unit modules.

The electrode terminals of the battery cells may be coupled to each other using various methods, such as welding, soldering, and mechanical coupling. Preferably, the electrode terminals of the battery cells are coupled to each other by welding.

A unit cell stack, in which electrode terminals of unit cells are connected to each other and in which the unit cells are stacked with high integration, are vertically mounted in upper and lower cases which are coupled to each other in an assembly structure.

The upper and lower cases are configured in a structure in which the upper and lower cases surround only the outer circumference of the unit cell stack, and therefore, most of the outside of the unit cell stack is exposed to the outside, preferably, so as to achieve easy dissipation of heat from the unit cell stack in a state in which the upper and lower cases are coupled to each other. As previously described, therefore, the upper case is configured to surround one side of the unit cell stack and to surround a portion of an upper end and a portion of a lower end of the unit cell stack, and the lower case is configured to surround the other side of the unit cell stack and to surround a portion of the upper end and a portion of the lower end of the unit cell stack.

Preferably, the lower case is provided at the inside of the front and the rear thereof with fixing grooves, into which series connection parts, which are bent, between the electrode terminals of the unit cells are fixedly inserted. Consequently, it is possible to prevent the movement of the unit cell stack in the frontward and rearward direction and to maintain a stable insulation state between neighboring connections of the electrode terminals.

Preferably, the lower case is provided at the front thereof with a pair of slits, through which outermost electrode terminals of the unit cell stack are inserted. When the unit cell stack is mounted in the lower case, the outermost electrode terminals are exposed to the outside through the slits, and then the exposed portions of the outermost electrode terminals are brought into tight contact with the front of the lower case. Consequently, it is possible for the outermost electrode terminals to be more easily connected to the bus bars provided at the front of the lower case.

Meanwhile, the bus bars are preferably configured such that upper ends of the bus bars are formed in the shape of a depressed groove, into which the external input and output terminals provided at the front of the upper case are inserted when the upper and lower cases are coupled to each other. Consequently, it is possible to achieve easy coupling between the external input and output terminals and the bus bars.

Preferably, the front cover is coupled to the lower case in an assembly manner. Also, the front cover may be further provided with holes for fixing a power cable. Insulative coupling members coupled to corresponding portions of the power cable may be inserted into the holes to fix the power cable.

The upper and lower cases are coupled to each other in such a manner that the unit cell stack is mounted to one case (for example, the lower case), which is then coupled to the other case (for example, the upper case) in an assembly manner. The cases may be coupled to each other in various manners. For example, the cases may be coupled to each other in a structure in which screws are threadedly engaged into threaded grooves formed at opposite sides of the cases or in a structure in which hooks are formed at one of the cases and coupling holes corresponding the hooks are formed at the other case such that the cases can be coupled to each other without using an additional member.

The lower case may be provided at the lower end of the front and/or the rear thereof with a coupling part protruding from the lower case such that the coupling part is fixed to an external device, the coupling part having a through hole formed in a center thereof.

According to circumstances, a battery management system (BMS) connected to the sensing member for monitoring and controlling the operation of the battery module may be mounted to the rear of the lower case.

In accordance with another aspect of the present invention, there is provided a middle- or large-sized battery module exhibiting excellent heat dissipation properties.

Specifically, the middle- or large-sized battery module includes a plurality of plate-shaped battery cells mounted in a module case in a state in which the battery cells are sequentially stacked, each of the plate-shaped battery cells includes an electrode assembly of a cathode/separator/cathode structure mounted in a battery case formed of a laminate sheet including a resin layer and a metal layer, and a plurality of heat dissipation members disposed in two or more interfaces between the battery cells and a heat exchange member for integrally interconnecting the heat dissipation members are mounted at one side of the battery cell stack, whereby heat generated from the battery cells during charge and discharge of the battery cells is removed by the heat exchange member.

Generally, a battery module is configured in a structure in which battery cells are stacked while being arranged at predetermined intervals to form coolant channels such that air flows through the coolant channels (in an air cooling type) to prevent overheating of the battery cells. However, this type of battery module does not provide a sufficient heat dissipation effect.

In the battery module with the above-stated construction according to the present invention, on the other hand, a plurality of heat dissipation members are disposed in two or more interfaces between the battery cells, and a heat exchange member for integrally interconnecting the heat dissipation members is mounted at one side of the battery cell stack. Consequently, it is possible to cool the battery cell stack with higher cooling efficiency than a conventional cooling system without the provision of spaces between the respective battery cells or although small spaces are provided between the respective battery cells, and therefore, it is possible to maximize heat dissipation efficiency of the battery module and to stack the battery cells with high integration.

As a result, it is possible for the battery module with the above-stated construction to effectively discharge heat generated from the battery cells to the outside through thermal conduction based on the heat dissipation members and the heat exchange member having the specific structures as described above.

Meanwhile, a material for the heat dissipation members is not particularly restricted as long as each of the heat dissipation members exhibits high thermal conductivity. For example, each of the heat dissipation members may be made of a metal sheet exhibiting high thermal conductivity. The heat dissipation members may be disposed in all of the interfaces between the battery cells or in some of the interfaces between the battery cells. In a case in which the heat dissipation members are disposed in all of the interfaces between the battery cells, the respective battery cells are in contact with different heat dissipation members at opposite sides thereof. On the other hand, in a case in which the heat dissipation members are disposed in some of the interfaces between the battery cells, some of the battery cells may be in contact with the heat dissipation members only at one side thereof.

Also, a material for the heat exchange member is not particularly restricted as long as the heat exchange member exhibits high thermal conductivity. Preferably, the heat exchange member is made of a metal material exhibiting higher thermal conductivity and higher mechanical strength than other materials. The heat dissipation members are connected to the heat exchange member, and therefore, it is possible to efficiently achieve heat transfer.

Preferably, the heat dissipation members are disposed in the interfaces between the battery cells in a state in which the heat dissipation members are at least partially exposed outward from the stacked battery cells, and the exposed portions of the heat dissipation members are bent in a lateral direction of the battery cells. That is, the heat dissipation members disposed in the interfaces between the battery cells receive heat generated from the battery cells and easily transmit the received heat to the heat exchange member through the bent portions, thereby effectively achieving dissipation of heat from the battery cells.

The heat exchange member may be mounted on the bent portions of the heat dissipation members in various manners, such as welding and mechanical coupling. Therefore, heat generated from the battery cells is transmitted to the heat dissipation members disposed between the battery cells and is then effectively discharged via the heat exchange member mounted at one side of the battery cell stack.

Meanwhile, a middle- or large-sized battery pack uses a plurality of battery cells in order to provide high power and large capacity. In battery modules constituting such a battery pack, higher heat dissipation efficiency is needed to secure safety of the battery pack.

In accordance with a further aspect of the present invention, therefore, there is provided a battery pack manufactured by combining battery modules based on desired power and capacity using the battery modules as unit bodies.

The battery pack according to the present invention includes a plurality of battery cells in order to provide high power and large capacity. Consequently, the battery pack according to the present invention is preferably used as a power source for electric vehicles, hybrid electric vehicles, or plug-in hybrid electric vehicles in which high-temperature heat generated during the charge and discharge of the battery cells is a serious safety concern.

Particularly in the electric vehicles and plug-in hybrid electric vehicles, which require high power from the battery pack for a long period of time, a high heat dissipation property is needed. Therefore, the battery pack according to the present invention is more preferably used as a power source for the electric vehicles or the plug-in hybrid electric vehicles.

Advantageous Effects

As is apparent from the above description, the battery module according to the present invention is configured in a structure in which the heat sink is mounted to the electrical connection regions between the unit cells and/or to the outsides of the battery module connection members connected to the electrical connection regions. Consequently, it is possible for the heat sink to absorb high-temperature heat generated from the electrical connection regions and/or the battery module connection members and to maintain the temperature of the battery module at a predetermined level or less, thereby preventing explosion of the battery module.

Also, it is possible to effectively prevent physical and chemical deformation of the electrical connection regions between the unit cells and the battery module connection members due to generation of high-temperature heat or heat build up and, eventually, to restrain the change in overall resistance of the battery module, thereby maintaining optimal operation of the battery module.

In particular, the heat sink can be easily applied to the corresponding regions of the battery module while the structure of the battery module is not greatly changed. Consequently, the heat sink exhibits high thermal conductivity, and therefore, the heat sink exhibits excellent response to the thermal change at the corresponding regions of the battery module.

BRIEF DESCRIPTION OF THE DRAWINGS

The above and other objects, features and other advantages of the present invention will be more clearly understood from the following detailed description taken in conjunction with the accompanying drawings, in which.

BEST MODE

Now, exemplary embodiments of the present invention will be described in detail with reference to the accompanying drawings. It should be noted, however, that the scope of the present invention is not limited by the illustrated embodiments.

Figure 1:
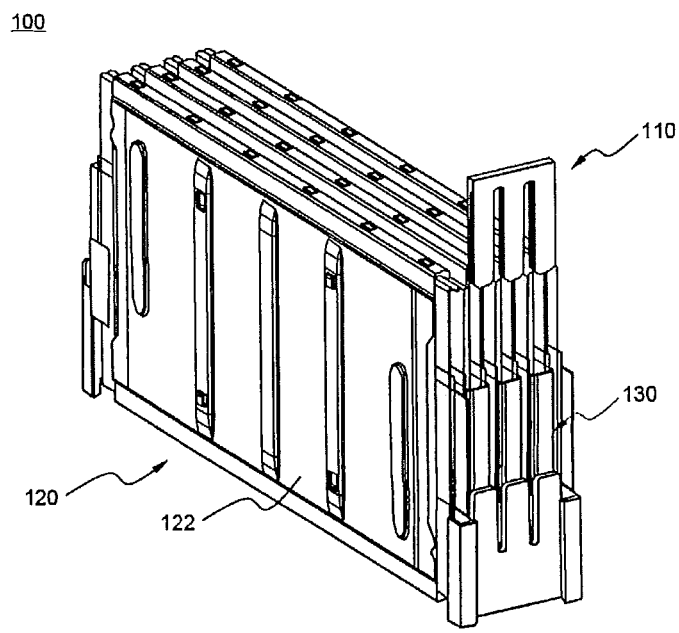
FIG. 1 is a perspective view illustrating a battery module according to an embodiment of the present invention.
Figure 2:
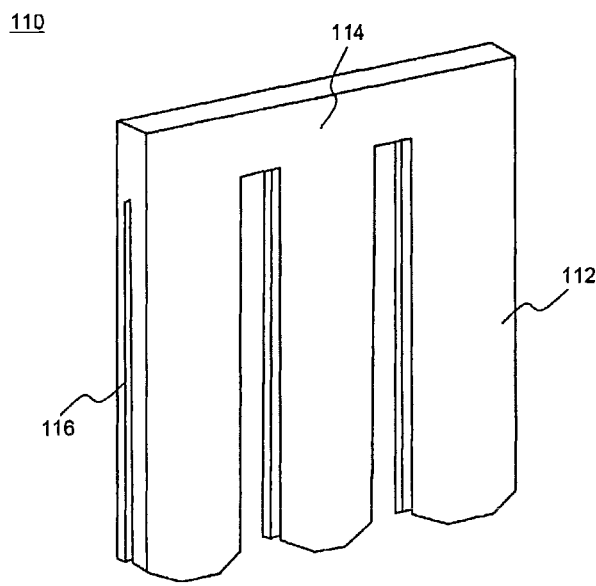
FIG. 2 is a typical view illustrating a heat sink of FIG. 1.

FIG. 1 is a perspective view illustrating a battery module according to an embodiment of the present invention, and FIG. 2 is a typical view illustrating a heat sink of FIG. 1.

Referring to these drawings, a battery module 100 includes a unit module stack 120 including four unit modules 122, which can be charged and discharged, stacked in the lateral direction thereof and a heat sink 110 connected to electrical connection regions 130 between the unit modules 122 for absorbing heat generated from the unit modules 122 during the charge and discharge of the unit modules 122.

The heat sink 110 includes three bar type contact parts 112 configured to be in tight contact with the outsides of the electrical connection regions 130 between the unit modules 122 and a connection part 114 configured to integrally connect corresponding ends of the contact parts 112. In this structure, the heat sink 110 is mounted to the battery module 100 in such a manner that the electrical connection regions 130, at which electrode terminals of the unit modules 122 are electrically connected to each other, are inserted into slits 116 defined between the contact parts 112 of the heat sink 110.

Also, the heat sink 110 contains a highly endothermic material, such as paraffin, in a sealing member constituted by the three bar type contact parts 112 and the connection part 114 for more effectively absorbing heat applied to the electrical connection regions 130 between the unit modules 122.

Figure 3:
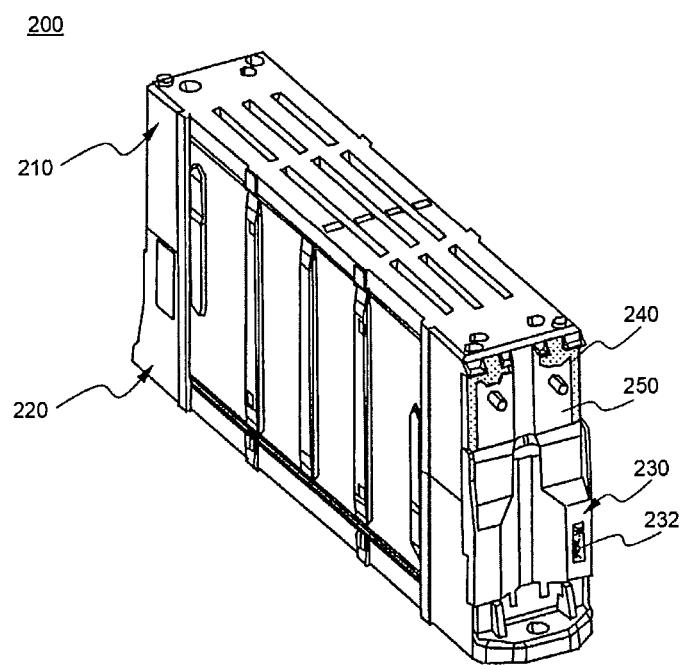
FIG. 3 is a perspective view illustrating a structure in which an upper case and a lower case are mounted to the battery module of FIG. 1.

FIG. 3 is a perspective view typically illustrating a structure in which an upper case and a lower case are mounted to the battery module of FIG. 1

Referring to FIG. 3 together with FIG. 1, a battery module 200 includes a unit module stack 120, an upper case 210 and a lower case 220 for partially surrounding the unit module stack 120, a sensing member (not shown), and a front cover 230. The respective constructional elements will be described in detail with reference to FIG. 4.

A heat sink 240 is formed in a shape corresponding to the outsides of bus bars 250. The heat sink 240 is mounted to the insides of the bus bars 250 excluding regions connected to the electrical connection regions between the unit modules. According to circumstances, the heat sink 240 may be mounted at the outsides of the bus bars 250.

At the front cover 230 are formed holes 232 for fixing a power cable. Insulative coupling members (not shown) coupled to corresponding portions of the power cable are inserted into the holes 232 to fix the power cable.

Figure 4:
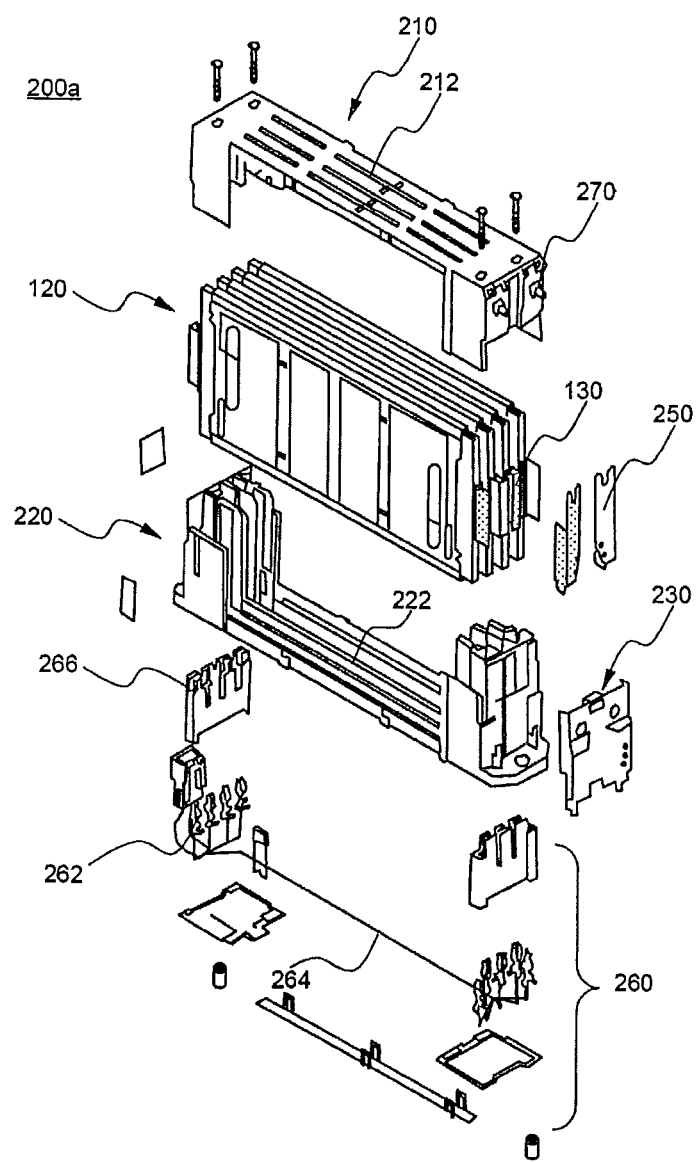
FIG. 4 is an exploded view illustrating the battery module of FIG. 3 excluding the heat sink.

FIG. 4 is an exploded view typically illustrating the battery module of FIG. 3 excluding the heat sink.

Referring to FIG. 4, a battery module 200a includes a unit module stack 120, an upper case 210 and a lower case 220 for partially surrounding the unit module stack 120, a sensing member 260, and a front cover 230, as previously described.

The lower case 220 is coupled to the upper case 210 for surrounding the other side of the unit module stack 120 and surrounding a portion of the upper end and a portion of the lower end of the unit module stack 120. At the front of the lower case is provided a pair of bus bars 250 for connecting electrode terminals of the unit module stack 120 to external input and output terminals 270 provided at the front of the upper case 210. That is, the upper and lower cases 210 and 220 are configured in a structure in which the upper and lower cases 210 and 220 surround only the outer circumference of the unit module stack 120, and therefore, most of the outside of the unit module stack 120 is exposed to the outside so as to achieve easy dissipation of heat from the unit module stack 120 in a state in which the upper and lower cases 210 and 220 are coupled to each other.

The upper ends of the bus bars 250 are formed in the shape of a depressed groove, into which the external input and output terminals 270 provided at the front of the upper case 210 are inserted when the upper and lower cases 210 and 220 are coupled to each other.

At the insides of the upper case 210 and the lower case 220 are formed a plurality of mounting grooves 222 into which the outer circumferences of battery cells or unit modules are inserted.

Also, a plurality of through holes 212, through which a coolant (mainly, air) flows, are formed in the upper case 210 and the lower case 220 for achieving effective cooling in a state in which the unit module stack 120 is mounted.

The front cover 230, which is made of an insulative material, is mounted to the front of the lower case 220 for protecting connection regions between the electrode terminals 130 of the unit module stack 120 and the bus bars 250 from the outside.

At left and right sides of the front of the lower case 220 are formed a pair of slits through which outermost electrode terminals of the unit module stack 120 are inserted. When the unit module stack 120 is mounted to the lower case 220, the outermost electrode terminals of the unit module stack 120 are exposed through the slits, and then the outermost electrode terminals of the unit module stack 120 are bent such that the outermost electrode terminals of the unit module stack 120 come into contact with the front of the lower case 220. As a result, the outermost electrode terminals of the unit module stack 120 are more easily brought into contact with the bus bars 250 provided at the front of the lower case 220.

The sensing member 260 includes sensing frames 266 mounted in spaces defined at the front and the rear of the lower case 220, sensing parts 262 disposed in the respective sensing frames 266, and a wire type conduction part 264 for connecting the sensing parts 262 to each other. According to circumstances, a battery management system (BMS), which is not shown, for monitoring and controlling the operation of the battery module may be mounted to the rear of the lower case 220 such that the BMS is connected to the sensing member 260.

Figure 5:
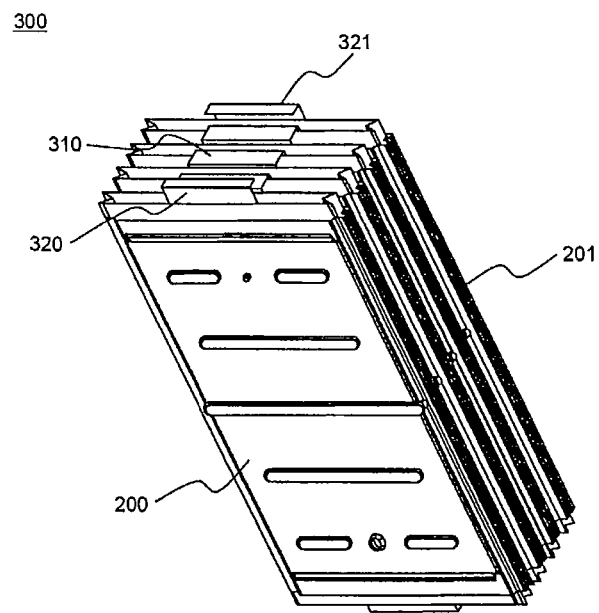
FIG. 5 is a perspective view illustrating a unit module stack according to another embodiment of the present invention.

FIG. 5 is a perspective view typically illustrating a unit module stack according to another embodiment of the present invention.

Referring to FIG. 5, a unit module stack 300 includes four unit modules 200 and 201. Each of the unit modules 200 has two battery cells (not shown) mounted therein. Therefore, the unit module stack 300 includes a total of eight battery cells. Electrode terminals between the respective battery cells are connected in series to each other, and electrode terminals between the respective unit modules are also connected in series to each other. Electrode terminal connections 310 are bent in a '[' shape in section to configure the unit module stack. Outside electrode terminals 320 and 321 of the outermost unit modules 200 and 201 are bent inward in a '⌐' shape in section in a state in which the outside electrode terminals 320 and 321 protrude slightly more than the other electrode terminal connections 310.

Figure 6:
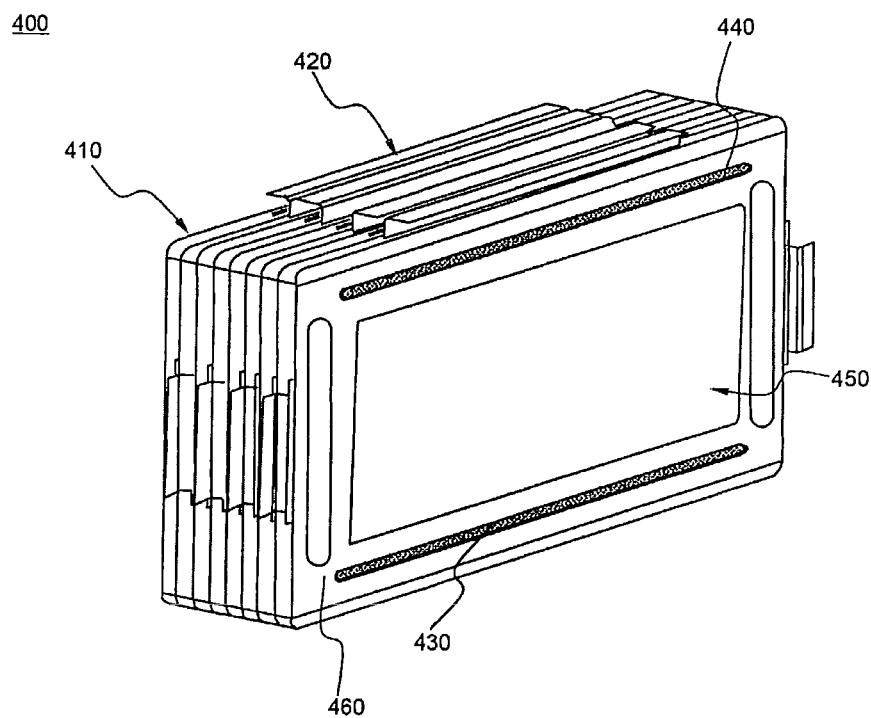
FIG. 6 is a perspective view illustrating a partial structure of a middle- or large-sized battery module according to another embodiment of the present invention.
Figure 7:
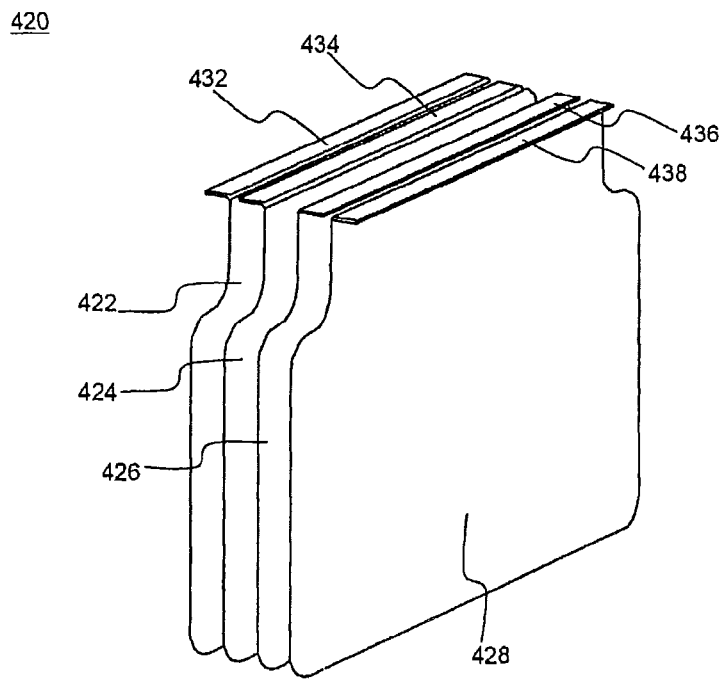
FIG. 7 is a typical view illustrating heat dissipation members of FIG. 6.

FIG. 6 is a perspective view typically illustrating a partial structure of a middle- or large-sized battery module according to another embodiment of the present invention, and FIG. 7 is a typical view illustrating heat dissipation members of FIG. 6.

Referring to these drawings, in a battery module 400 configured in a structure in which eight cartridges 410 are sequentially stacked, four heat dissipation members 420 are partially disposed in interfaces between the respective cartridges 410 such that heat generated from the cartridges 410 (specifically, heat generated from the battery cells mounted in the respective cartridges) is conducted to the heat dissipation members 420. As a result, a high heat dissipation effect is achieved.

Elastic pressing members 430 and 440 are mounted to the outsides of frames 460 of the eight cartridges 410 for assisting the heat dissipation members 420 to be stably mounted and fixed to the frames 460 of the cartridges 410.

Meanwhile, each of the heat dissipation members 422, 424, 426, and 428 is made of a metal sheet exhibiting high thermal conductivity. Exposed portions 432, 434, 436, and 438 of the heat dissipation members 422, 424, 426, and 428 are bent in the lateral direction of the cartridges 410.

Consequently, heat generated from battery cells 450 during the charge and discharge of the battery cells 450 is transmitted to the heat dissipation members 420 disposed between the respective cartridges 410, and is then discharged to the outside via a heat exchange member (not shown), with the result that it is possible to achieve high heat dissipation efficiency although the battery module is configured in a compact structure.

Figure 8:
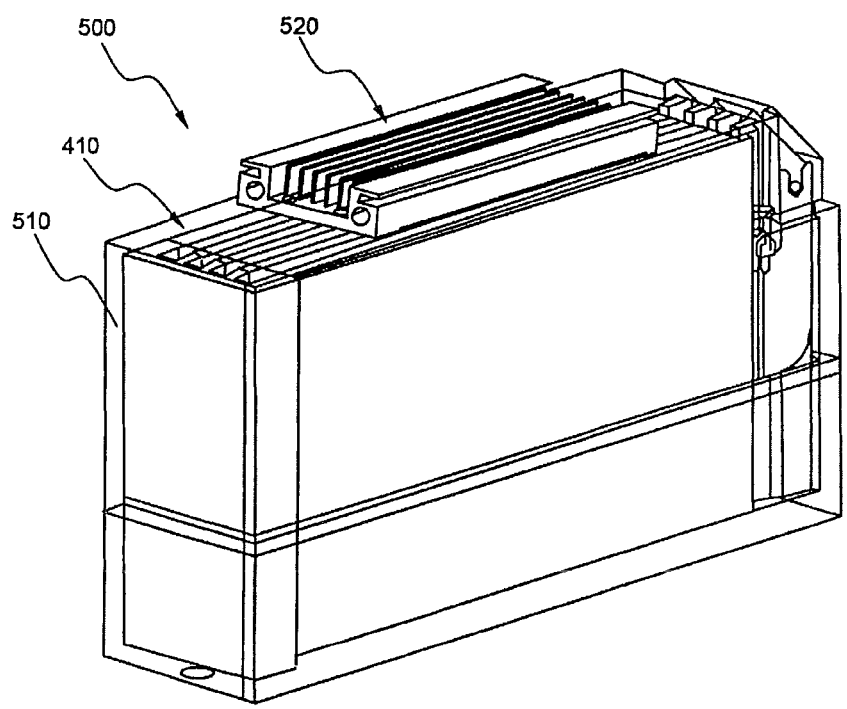
FIG. 8 is a typical view illustrating a structure in which a heat exchange member is mounted to one side of the middle- or large-sized battery module of FIG. 6.
Figure 9:
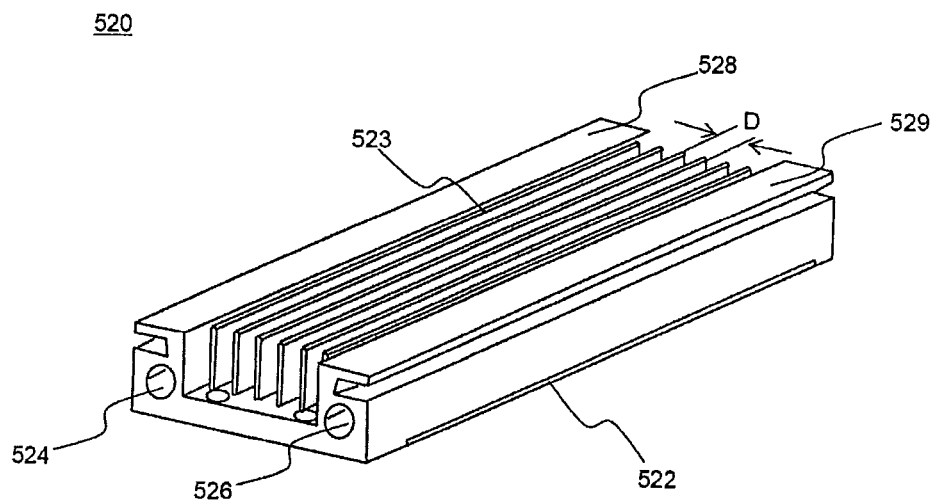
FIG. 9 is a typical view illustrating the heat exchange member of FIG. 8.

FIG. 8 is a typical view illustrating a structure in which a heat exchange member is mounted to one side of the middle- or large-sized battery module of FIG. 6, and FIG. 9 is a typical view illustrating the heat exchange member of FIG. 8.

Referring to these drawings together with FIG. 6, a battery module 500 mounted in a module case 510 is configured in a structure in which a heat exchange member 520 is mounted to the top of a stack constituted by sequentially stacking a plurality of cartridges 410.

The heat exchange member 520 includes a bottom part 522 mounted to the top of the module case 510 such that the heat dissipation members 420 are in tight contact with the bottom part 522, side parts 528 and 529 connected to the bottom part 522, the side parts 528 and 529 being provided with coolant channels 524 and 526 extending in the longitudinal direction of the side parts 528 and 529, and a plurality of heat dissipation fins 523 disposed between the side parts 528 and 529 in a state in which the heat dissipation fins 523 extend upward from the bottom part 522.

That is, the coolant channels 524 and 526 are provided such that a coolant, such as water, can be flow through the coolant channels 524 and 526, and the heat dissipation fins 523 are arranged at predetermined intervals D for air flow. Consequently, it is possible to remove heat transmitted from the heat dissipation members 420 with high reliability and excellent cooling efficiency.

Figure 10:
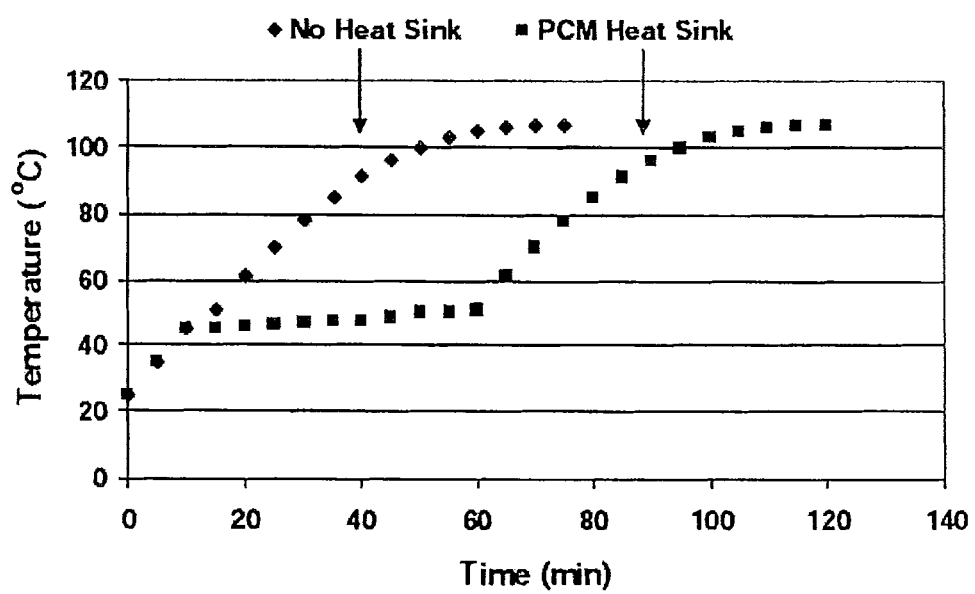
FIG. 10 is a graph illustrating the change of a battery module before and after a heat sink is applied to the battery module.

FIG. 10 is a graph illustrating the change of a battery module before and after a heat sink is applied to the battery module.

Referring to FIG. 10, in a battery module having a heat sink applied thereto, the heat sink absorbs a large amount of high-temperature heat generated from electrical connection regions due to high current to maintain the temperature of the battery module at 42° C. or less for approximately one hour, thereby preventing explosion of the battery module as compared with a battery module having no heat sink applied thereto.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A battery module, comprising:
   a plurality of stacked battery cells or unit modules;
   electrical connection regions extending from the battery cells or unit modules, the electrical connection regions electrically connecting the battery cells or unit modules;
   a heat sink mounted to at least one of the electrical connection regions, wherein the heat sink includes:
      a connection part; and
      a plurality of bar contact parts extending from the connection part perpendicular to the connection part, each bar contact part having a slit formed therein extending parallel to the connection part; and
   bus bars for connecting electrode terminals of the battery cells or unit modules to external input and output terminals, wherein portions of outsides of the bus bars are connected to the electrical connection regions,
   wherein, when the heat sink is mounted to the battery module, the electrical connection regions are inserted into the slits,
   wherein the heat sink is formed in a shape so as to not extend beyond outermost edges of the bus bars, and the heat sink is mounted to insides or outsides of the bus bars excluding said portions, and
   wherein an overall length of the heat sink in a first direction is less than an overall length of the plurality of stacked battery cells or unit modules in the first direction.

2. The battery module according to claim 1, wherein the heat sink is located at a top of a sensing member for detecting voltage and/or current.

3. The battery module according to claim 1, wherein the heat sink includes a heat absorbing material contained in a sealing member.

4. The battery module according to claim 1, wherein the heat sink includes a heat absorbing material contained in a sheet member in a state in which the heat absorbing material is supported by a capsule, and the sheet member includes a fiber-shaped member.

5. The battery module according to claim 3, wherein the heat absorbing material is selected so as to change phase at a specific temperature between 50° C. and 150° C.

6. The battery module according to claim 5, wherein the phase change material is one selected from a group consisting of paraffin, polyethylene glycol and inorganic hydrates or combinations thereof.

7. The battery module according to claim 1, wherein the battery module includes the plurality of battery cells or unit modules as unit batteries.

8. The battery module according to claim 7, wherein the battery module includes
   (a) a unit cell stack including the plurality of battery cells or unit modules connected in series to each other in a state in which the battery cells or unit modules stand in a lateral direction, (b) an upper case configured to surround one side of the unit cell stack and to surround a portion of an upper end and a portion of a lower end of the unit cell stack, the upper case being provided at a front thereof with external input and output terminals, (c) a lower case coupled to the upper case, the lower case configured to surround the other side of the unit cell stack and to surround a portion of the upper end and a portion of the lower end of the unit cell stack, the upper case being provided at a front thereof with the bus bars for connecting electrode terminals of the battery cells or unit modules to the external input and output terminals, (d) a sensing member including frames for the sensing member mounted in spaces defined at a front and a rear of the lower case, each frame including a sensing part disposed therein, and a conduction part for connecting the sensing parts to each other, and (e) a front cover mounted to the front of the lower case for protecting connection regions between the electrode terminals of the battery cells or unit modules and the bus bars from outside.

9. The battery module according to claim 8, wherein the unit cell stack includes a plurality of unit modules each including plate-shaped battery cells each having electrode terminals formed at an upper end and a lower end thereof, and each of the unit modules includes two or more battery cells configured such that electrode terminals of the battery cells are connected in series to each other and connections between the electrode terminals are bent, the battery cells being stacked, and a pair of cell covers coupled to each other for surrounding outsides of the battery cells excluding the electrode terminals of the battery cells.

10. The battery module according to claim 8, wherein the lower case is provided at an inside of the front and the rear thereof with fixing grooves, into which the connections between the electrode terminals are fixedly inserted.

11. The battery module according to claim 8, wherein the lower case is provided at the front thereof with a pair of slits, through which outermost electrode terminals of the unit cell stack are inserted.

12. The battery module according to claim 11, wherein the outermost electrode terminals are bent, after being inserted through the respective slits, such that the outermost electrode terminals are connected to the bus bars provided at the front of the lower case.

13. The battery module according to claim 8, wherein the bus bars are configured such that upper ends of the bus bars are formed in the shape of a depressed groove, into which the external input and output terminals provided at the front of the upper case are inserted when the upper and lower cases are coupled to each other.

14. The battery module according to claim 8, wherein the front cover is coupled to the lower case.

15. The battery module according to claim 8, wherein the front cover is provided with a groove for fixing a power cable.

16. The battery module according to claim 8, wherein the lower case is provided at a lower end of the front and/or the rear thereof with a coupling part protruding from the lower case such that the coupling part is fixed to an external device, the coupling part having a through hole formed in a center thereof.

17. The battery module according to claim 7, wherein the battery module includes a plurality of plate-shaped battery cells mounted in a module case in a state in which the battery cells are sequentially stacked, each of the plate-shaped battery cells includes an electrode assembly of a cathode/separator/anode structure mounted in a battery case formed of a laminate sheet including a resin layer and a metal layer, and a plurality of heat dissipation members disposed in two or more interfaces between the battery cells and a heat exchange member for integrally interconnecting the heat dissipation members are mounted at one side of the battery cell stack, whereby heat generated from the battery cells during charge and discharge of the battery cells are removed by the heat exchange member.

18. The battery module according to claim 17, wherein each of the heat dissipation members is made of a metal sheet.

19. The battery module according to claim 17, wherein the heat exchange member is made of a metal material.

20. The battery module according to claim 17, wherein the heat dissipation members are disposed in the interfaces between the battery cells in a state in which the heat dissipation members are at least partially exposed outward from the stacked battery cells, and the exposed portions of the heat dissipation members are bent in a lateral direction of the battery cells.

21. A battery pack including the battery module according to claim 1 as a unit body.

22. The battery pack according to claim 21, wherein the battery pack is used as a power source for electric vehicles, hybrid electric vehicles, or plug-in hybrid electric vehicles.

23. The battery module according to claim 1, wherein electrical connection regions comprise adjacent electrode terminals of the battery cells or unit modules connected to each other.

* * * * *